United States Patent [19]
Calhoun

[11] 3,795,972

[45] Mar. 12, 1974

[54] INTEGRATED CIRCUIT INTERCONNECTIONS BY PAD RELOCATION

[75] Inventor: Donald F. Calhoun, Inglewood, Calif.

[73] Assignee: Hughes Aircraft Company, Culver City, Calif.

[22] Filed: Dec. 9, 1971

[21] Appl. No.: 206,555

Related U.S. Application Data

[62] Division of Ser. No. 762,459, Sept. 25, 1968.

[52] U.S. Cl. ........................ 29/574, 29/577, 29/578

[51] Int. Cl. ........................ B01j 17/00

[58] Field of Search ........................ 29/574, 577, 578

[56] References Cited

FOREIGN PATENTS OR APPLICATIONS 1,117,579 6/1967 Great Britain .................. 317/101 A

*Primary Examiner*—Charles W. Lanham
*Assistant Examiner*—W. C. Tupman
*Attorney, Agent, or Firm*—W. H. MacAllister

[57] ABSTRACT

Pad relocation is a technique which allows a predetermined standard pattern of good circuits to be established on all LSI slices used to perform the same array function regardless of the varying yield patterns determined by DC wafer probe tests. This is accomplished by relocating the pads of nearby good circuits to the positions where good circuits were specified by a prescribed master pattern, but were not found during wafer probe tests. Where good circuits are found in expected good circuit locations, those circuits are used without relocation. Thus, the pad relocation technique functionally establishes a specified pattern of good circuits as if there had actually been a 100 percent circuit yield in that pattern. A single wiring pattern can then be generated for all the LSI arrays of the same function to accomplish the much more complex signal interconnect between the master pattern circuits. By determining standard cross-under areas within the pad relocation layer where relocation lines need never occur, large arrays can be interconnected with the same number of total interconnect layers as required by discretionary techniques.

10 Claims, 15 Drawing Figures

INVENTOR
DONALD F. CALHOUN,
BY

Robert Thompson

ATTORNEY.

INTEGRATED CIRCUIT INTERCONNECTIONS BY PAD RELOCATION

This is a division of application Ser. No. 762,459, filed Sept. 25, 1968 and now abandoned.

BACKGROUND OF THE INVENTION

This invention relates generally to integrated circuits and more particularly relates to means and methods of interconnecting a plurality of integrated circuits by converting a random distribution of circuit signal-connect areas into a standard pattern of signal-connect areas.

It is well known in the semiconductor art to fabricate in a single body of semiconductor material, which is referred to as a wafer, a plurality of circuits in a predetermined array. Each circuit can, for example, include a plurality of active and passive electronic or electrical circuit elements which are electrically interconnected with one another so that the circuit will operate in a specified manner such as, for example, a digital adder or a gate. Interconnections are usually made with these circuits by conductors, or lines, which are routed to selected active and passive components formed in the metalization of each circuit. The end of these lines, where an interconnection is usually made, is generally formed into an enlarged area commonly referred to as a pad.

Typically, there can presently be about four hundred discrete circuits on each one-and-one-half-inch wafer, of which seventy-five to two hundred might be determined to be good, or otherwise usable. The good circuits usually occur in an unpredictable pattern and may be clustered throughout the array. In addition, the individual circuits are relatively small and densely packed. For example, each circuit can be 0.060 inches by 0.060 inches square with possibly up to fourteen or more pads.

Heretofore, with the present state of the art, it has been exceedingly difficult to interconnect the good circuits in the array with other good circuits. Furthermore, the difficulty would still exist even if the yield of good circuits approached 100 percent. In addition, interconnect difficulties would exist even with a 100 percent yield of functionally different circuits are mixed on a wafer and are located at different positions in the array or even at different positions in different batches. Still further, there is the combined problem associated with interconnecting circuits in an array of less than 100 percent yield wherein there are intermixed functionally different circuits in this same array, or even where the size of the circuits varies throughout the array or from wafer to wafer.

Heretofore, other techniques have been used to provide interconnects between integrated circuits on a single wafer. One technique has been to functionally test an array for good circuits. Then a layer of insulating material with feedthroughs to the pads of only selected good circuits is laid down across the array. Thereafter, alternating layers of conductors or lines and layers of insulating material having feedthroughs or apertures therethrough are formed on the wafer. The feedthroughs interconnect the pads of the good circuits to the layers of interconnect lines formed for each wafer. Since the pattern of good circuits varies from wafer to wafer, the pattern of feedthroughs and pattern of conductors in each layer has varied in position and routing from wafer to wafer in a discretionary manner. This discretionary interconnect technique could require exhaustive routing and masking operations which were customized for each wafer. As a result, the masks generated for each layer of interconnect were usable only for that single wafer because of the varying locations of good circuits.

SUMMARY OF THE INVENTION

It is therefore an object of the present invention to provide improvements in making electrical connections between integrated circuitry components.

It is still another object of this invention to provide improved means and methods for locating desired circuits in a standard pattern.

It is another object of this invention to provide simplifications in the means and the methods of making electrical connections between a plurality of circuits in an integrated circuit array which are unpredictably located or variably located from wafer to wafer.

These and other objectives of the invention can be attained by providing an integrated circuit wafer having arrays of circuits thereon, wherein each circuit is electrically tested to determine the location of usable circuits or good circuits. Then a layer of insulating material with feedthroughs to the pads of only selected usable circuits is formed over the circuits to expose only the pads of the good circuits and to isolate unusable circuits. Thereafter, in conformance with a master pattern defining where good circuits are desired, interconnect lines are laid down from the exposed pads of the usable circuits to sites of standardized specified pad locations either by manual techniques or in accordance with a computer program. As a result, the pads of usable circuits are effectively relocated to positions where usable circuits are specified in the master pattern, that is, each usable circuit is effectively relocated from its actual position to a specified or desired circuit position. Once the pads are relocated to conform to the standard or master pattern, one or more layers of standard masks for identically placed feedthroughs in layers of dielectric and standard patterns of conductors are fabricated on top of the array to interconnect the selected circuits.

The attendant advantages of the invention are that the single set of standard interconnects between circuits above the first layer of metallization can be provided for many wafers independently of the locations of good circuits terminated in the first layer of metallization, thereby making it economically justified to optimize the set of interconnects. This optimization has the advantages of lower routing and mask casts, more readily controlled line lengths, preferred routing of lines, crossovers of electrically conducting lines and feedthroughs between conductor layers and of forming preferred sizes of conductors and common lines including power and ground lines. In addition, the need for multiple mask alignment is greatly reduced. Furthermore, it is possible to develop a feasible repair technique in which malfunctioning circuits are replaceable by unused circuits which previously have tested good; and automatic testing of the circuits could be enhanced by so locating the pads in a master pattern. Still further advantages are that the density of clustered good circuits can effectively be decreased by distributing or dispersing the pad locations of clustered good circuits across the wafer, thereby enabling more of the good circuits on the wafer or a portion of the wafer to be used. Also, with pad relocation, the standard masks of layers of interconnect and feedthroughs are not dependent on circuit size.

BRIEF DESCRIPTION OF THE DRAWINGS

Other objects, features and advantages of the invention will become apparent upon reference to the following detailed description of one embodiment of the invention and the accompanying drawings thereof, in which:

Referring now to the drawings in more detail, FIG. 1 illustrates an integrated circuit wafer 20, having a predominantly circular periphery except for one portion 21 thereof which is formed as a straight edge to enable proper orientation of the circuit. Integrated circuit wafer 20 is further divided into a plurality of individual integrated circuits 22 which are generally rectangular and arranged in a rectilinear array. Each one of these circuits can be 0.060 inches by 0.060 inches and is electrically separated from adjacent circuits by a border of electrically isolating material. Each circuit itself can include a plurality of active elements such as semiconductor diodes and transistors and passive elements such as conductors, resistors, and capacitors, which are coupled together in a predetermined circuit configuration so that, when electrical signals are applied to the circuit, it will operate in a predetermined manner.

In order to make connections with the circuits, each circuit 22 (FIG. 2) includes a plurality of connection areas or pads 24 located at the termination end of lines in a first level of metallization, with the pads usually having a somewhat larger area than the widths of their associated conductor lines. For example, the pads 24 can have a dimension of 0.003 inches by 0.003 inches, whereas the conductors may only be 0.0015 inches wide. There can be fourteen and possible more or fewer of these pads associated with each circuit. The active and passive elements of each circuit are arranged so that electrical signals can be applied to some of the pads, whereupon a portion of the integrated circuit can be used as a gate, flip-flop, or other circuit element or else input and output lines can be coupled to all of the pads so that the integrated circuit operates as a complete logic circuit, such as a full adder.

In those instances where a circuit, which is usable or operable, is synonymous with a good or functional circuit, the yield of usable circuits to total circuits on wafer 20 has heretofore been less than 100 percent. For example, the yield typically can be between 20 percent and 40 percent or greater. With such yields, there is no discernible pattern to the specific locations of usable circuits and nonusable circuits, since both are located unpredictably throughout the array. In many instances, usable and unusable circuits are clustered toward the center of the wafer.

In order to determine which ones of the circuits are usable or good, they are generally tested electrically so that the good circuits can be located and be properly identified. Generally, a d-c electrical test is made of each circuit to obtain adequate identification of the good circuits. In addition, further a-c electrical testing of the good circuits can be done for added confidence in the operating capabilities of the circuit.

Figure 1:
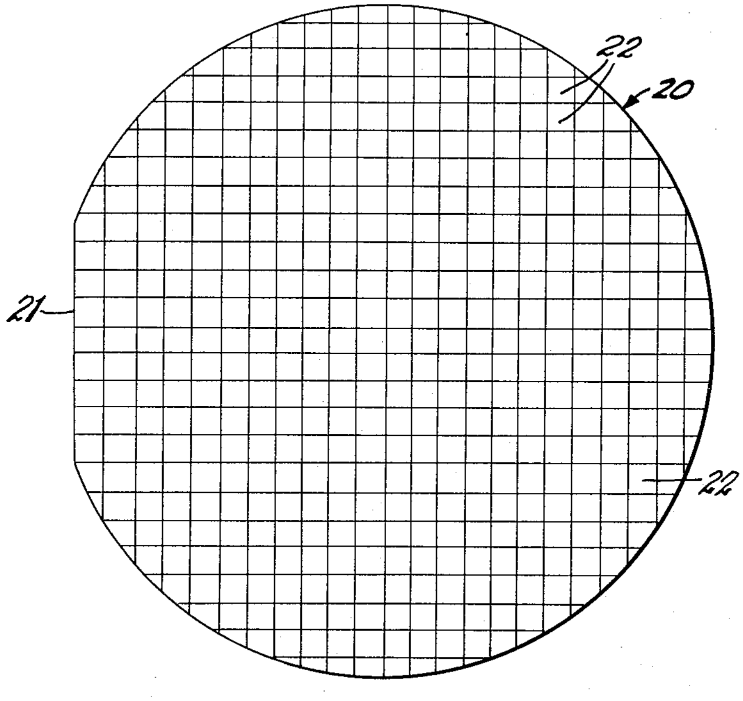
FIG. 1 is a plan view of an integrated circuit wafer having a plurality of circuits illustrated as individual rectangles in a rectilinear array.
Figures 2, 3:
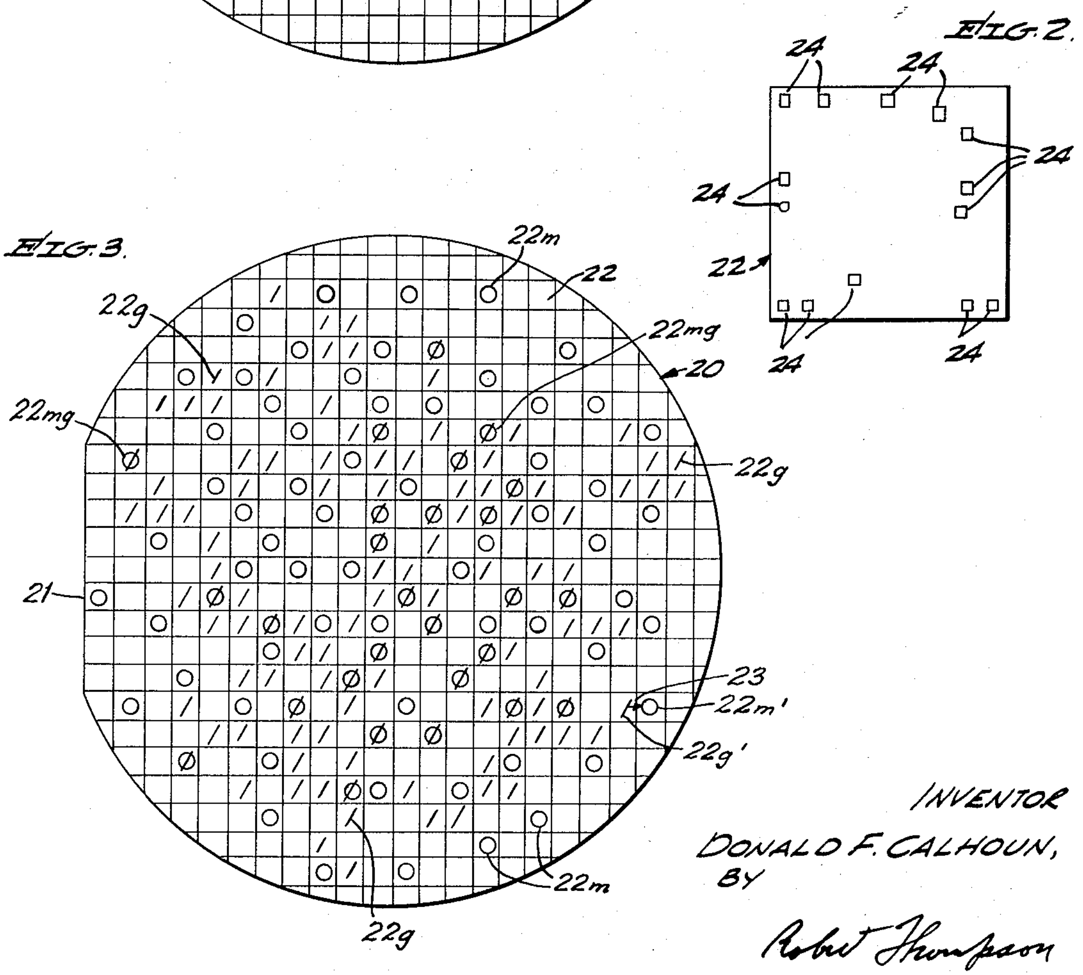
FIG. 2 is an enlarged plan view of one of the rectangularly shaped integrated circuits of FIG. 1 showing a plurality of pads existing in a first level of metallization in prearranged locations thereon.
FIG. 3 is a plan view of the integrated circuit wafer of FIG. 1 wherein the actual positions of usable circuits of the type illustrated in FIG. 2 are schematically identified by a "/" (slash) and a master pattern of predetermined circuit locations defining the desired positions of usable circuits are identified by a "O" (circle)

After electrical testing of the circuits has been completed, it is usually found that the good circuits, such as circuit **22*g*, occur in an unpredictable pattern, as identified by the "/" (slashes) in FIG. 3. As previously stated, a master pattern of predetermined circuit locations, or standard circuit locations, as identified by the "O" (circles), is previously created for wafer 20 and all other integrated circuit wafers which will be similarly interconnected into an identical electrical function. The predetermined circuit locations define desired positions 22*m* of usable or operable circuits to be selected from any of the good circuits 22***g*. It is to be understood that operable circuits corresponding in position to the desired positions 22*m* do not necessarily exist on wafer 20 but that, after rerouting of selected good circuits 22*g*, the terminations of the pads of the selected good circuits will be positioned at the desired positions of the pads conforming to the predetermined circuit locations of the master pattern. Thus, the good circuits are effectively relocated from their actual positions to desired positions. Where both actual good circuits and desired positions of master pattern circuits locations co-exist, e.g., as referenced by indicia 22*mg*, they are identified with a combination of a "O" (circle) with a "/" (slash) through it, that is, (ø).

When, however, a desired circuit position, e.g., circuit 22*m'*, in the master pattern does not contain or does not co-exist with the actual position of a good circuit, it is necessary to relocate the pads of a nearby good circuit, e.g., circuit 22*g'*, to sites of secondary pads placed at the desired positions of the predetermined circuit locations of the master pattern, as illustrated by arrow 23 representing a plurality of leads extending from the pads of good circuit 22*g'* to the sites of the secondary pads at the desired position 22*m'*. Since the greatest density of good circuits (ratio of good circuits per unit of wafer area) occurs toward the center of the wafer and decreases toward the wafer edges, it is probable that the greatest density of master pattern circuit locations will also be selected to be toward the center of the wafer in most applications. Of course, it should be understood that, even though the density of good circuits can be approximated, the specific good circuits occur in an unpredictable pattern.

In optimizing the master pattern of predetermined circuit locations, it is desirable to take into consideration the density of good circuits. For example, it is preferred to position each master pattern circuit location defining the desired positions of operable circuits so that it is superposed over, or positioned adjacent to, or otherwise placed in proximity with a large number of potentially available circuits in those areas on the wafer where the yield or density of good circuits is lowest and is in proximity with a smaller number of potentially available circuits where the density of good circuits is higher.

Figure 4:
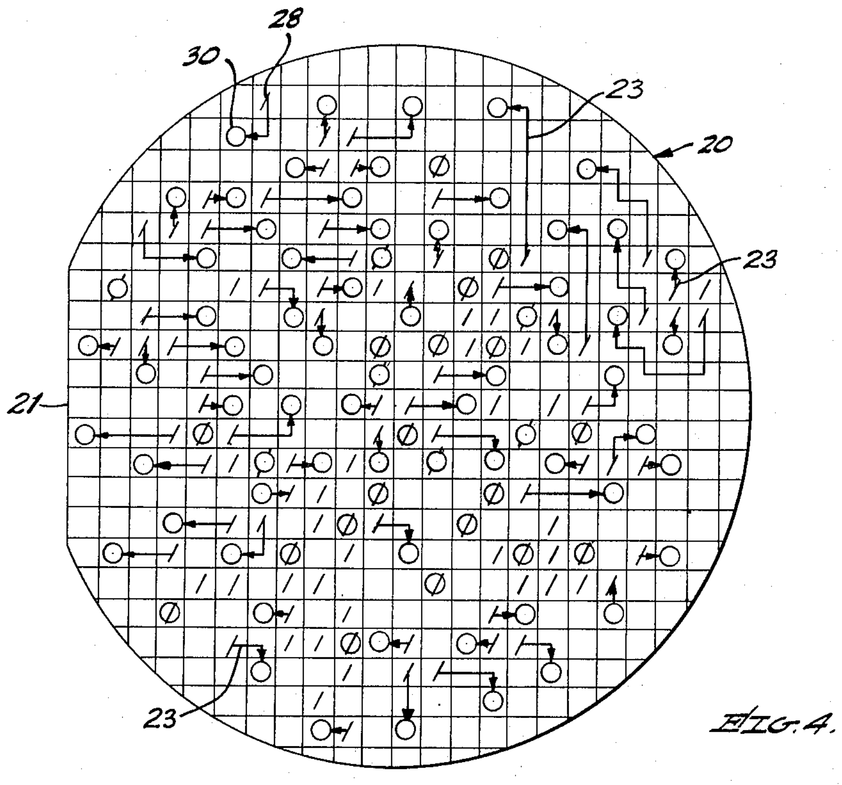
FIG. 4 is a plan view of the integrated circuit wafer of FIG. 3 showing schematically one general pattern of relocation routing for effectively relocating the actual positions of usable circuits to the desired positions defined by master pattern circuit locations.

For example, the spacing between master pattern circuit locations in FIG. 4 is such that, toward the edges of the wafer, no master pattern circuit location is positioned adjacent another master pattern circuit location. Thus, each master pattern circuit location is touching nine potentially available circuits since the master pattern circuit location is superposed over one circuit, its four edges border on four other circuits, and its four corners touch the corners of four other circuits.

Toward the center of the wafer, where the density of good circuits increases, some of the master pattern circuit locations are adjacent one another at the corners thereof or along one side thereof, thereby decreasing the number of potentially available circuits which the master pattern circuit location is adjacent. By matching the density of the master pattern circuit locations to the expected density of good circuits, the amount of discretionary routing required to relocate good circuits to desired positions defined by the locations of the master pattern is greatly reduced, if not altogether eliminated, and the routing of the logic interconnect is facilitated. Of course, as the yield of good circuits on the wafer increases, it can be desirable to increase the density of master pattern circuit locations and to have more master pattern circuit locations adjacent other master pattern circuit locations on more than one side and corner.

Referring now to FIG. 4, each good circuit can be relocated to a desired position defined by the master pattern circuit location by interconnect lines or electrical conductors extending from the pads of the good circuit to secondary pad sites at the desired circuit position defined by the selected master pattern circuit location. Such routing of the lines is illustrated collectively in a schematic manner by the straight line segments 23 having arrowheads on one end and extending between selected good circuits 28, selected from any of the good circuits 22*g*, and desired positions 30 (synonomous with positions 22*m'*) of the master pattern circuit locations. It should, of course, be understood that each one of the lines 23 with arrowheads is representative of a plurality or collection of individual interconnect lines or conductors 32 (see FIGS. 5*a*–5*c*) which are routed from the pads 24 of a good circuit 28 at its actual position to pads 24' at the desired position of the selected good circuit defined by its master pattern circuit location. Before referring to the interconnect lines in more detail, it should be noted that good circuits can be effectively relocated from their actual positions to their desired positions defined by the master circuit locations by a straight line routing pattern wherein the lines will only travel in a rectilinear manner, that is, up, down, to the left, or to the right. It should, of course, be understood that line segments other than straight lines can be used, including curved lines or combinations of straight and curved lines.

As a result of the relocation of selected good circuits to the desired positons conforming to the predetermined circuit locations of the master pattern, where no good circuits were previously found, a common or master pattern of good circuits is effectively established so as to allow standard masks to be used to form additional layers of interconnect lines or additional lines on the same layer.

Since the good circuits are always relocated to the same desired positions defined by master pattern circuit locations as a result of pad relocation, the same standard masks can be used on all other wafers which are interconnected to perform the same circuit operation or electrical function, even though the actual location of good circuits in the array varies from wafer to wafer.

One specific technique that can be used for relocating the circuits is to start with the uppermost left-hand desired position 30 defined by the master pattern circuit location, as viewed in FIG. 4, and to then determine the actual position of the nearest good circuit in accordance with the master pattern. For example, it may be desirable to start by searching for the nearest good circuit up to two circuits above the desired position defined by the master pattern circuit location. If no good circuit is found at these two positions on the wafer, it would then be necessary to search good circuit positions up to two circuits above and one circuit column to the left of the desired position defined by the master pattern circuit location. Again, if no good circuit is found, it would then be necessary to search for good circuits two columns to the left of the desired position defined by the master pattern circuit location. If a good circuit still is not found, it would then be necessary to search for good circuits in the row below the master pattern circuit location and to the right. As viewed in FIG. 4, the position 28 of a good circuit location is found one column to the right and one row up from the desired position 30 defined by the desired circuit location. This good circuit would then be relocated by interconnect lines as will be subsequently described with reference to FIGS. 5a–5c.

If a good circuit cannot be found within two circuits of the desired circuit position, it may be desirable to temporarily bypass that circuit relocation and to then return to it for consideration at the end of the search, whereupon an available good circuit may be relocated from a more distant position.

Figure 5A:
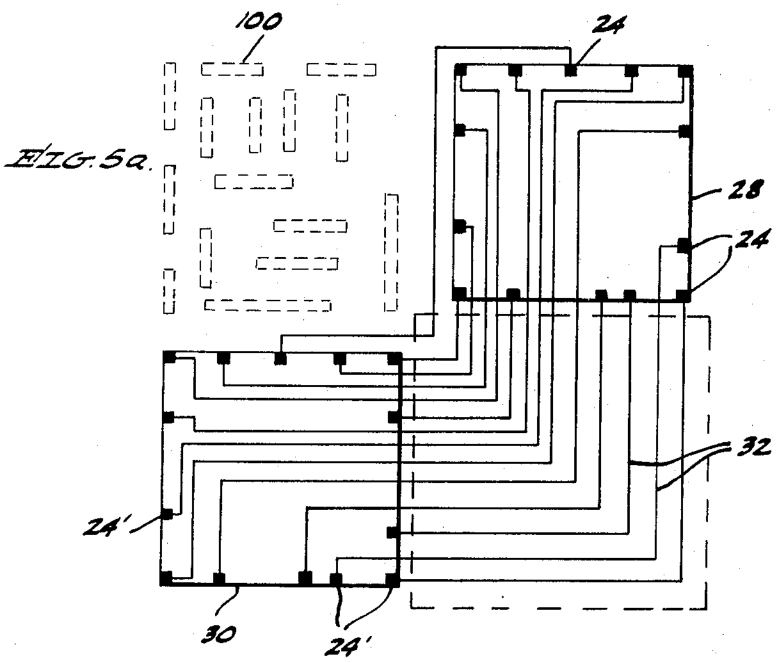
FIGS. 5*a*–5*c* are enlarged plan views illustrating three modes of the specific pad relocation routing for effectively relocating actual positions of usable circuits to desired positions defined by master pattern circuit locations my means of a plurality of interconnect lines routed from the pads of the usable circuit to desired pad positions conforming to the predetermined circuit locations in the master pattern.

Referring now to the details of one relocation such as the relocation of selected good circuit 28 of FIG. 4 at its actual position 22g' (FIG. 3) to its desired position 30 of FIG. 4 (indicia 22m' of FIG. 3) as defined by its predetermined circuit location of the master pattern, reference is made to FIG. 5a which illustrates one example of the topology of a good circuit's exposed pads and the relocation thereof to desired pad positions defined by its predetermined master pattern circuit location.

Generally, as will be explained in more detail with reference to FIGS. 6a–6c, a layer of electrically insulating material is deposited over a first level of metallization upon the surface of the integrated circuit wafer. A pattern of apertures or feedthroughs formed through the insulation material exposes the pads of only those good circuits which have been so identified and selected at their actual positions. Then, by means of a photo process, to be described in more detail with reference to FIGS. 7a and 7b, a plurality of interconnect lines 32 or interconnects of electrically conductive material in a second level of mettalization are routed from the exposed pads of the good circuit 28 to predetermined pad locations at a desired position 30 of the predetermined master pattern circuit locations. These interconnect lines are each made of a series of line segments which are rectilinearly routed up, or down, or to the left, or to the right, as viewed in FIG. 5, and can be formed on a computer-driven $x$–$y$ table, which is moved relative to a light beam in accordance with a computer program. In addition to the interconnect lines 32, the light beam is able to form at the desired positions the pads 24' which are of a larger size than the width of the interconnect lines. It should, of course, be understood that, although the line segments are illustrated as straight line segments which are routed at right angles to one another, it is possible to use curved line segments or combinations of curved and straight line segments and even to route the line segments on a diagonal.

It is to be further understood that interconnect lines of the type illustrated in FIG. 5 could also be made with a mask or transparency through which a layer of photoresist on top of the wafer 20 would be exposed for simultaneously forming all of the interconnect routing patterns from the actual positions of the selected good circuits to the desired positions thereof defined by the predetermined master pattern circuit locations.

In the routing pattern of FIG. 5a, each circuit can be of the type in which the entire circuit can be interconnected to operate as a logic circuit such as a flip-flop, a full adder, and so forth, or in which portions of the circuit can operate as logic elements such as NAND gates, which are independent of the other portions of the circuit when I/O and power lines are connected to only those pads associated with that portion of the circuit. Thus, considering that each circuit is capable of operating as four independent NAND gates, the pads 24 of each NAND gate can be effectively relocated to sites of secondary pads 24' in a desired position conforming to a master pattern circuit location along with the power and ground lines somewhat independently of their relative positions.

For example, the pads 24 of a first NAND gate which are located in the lower left hand quadrant of the good circuit can be relocated to sites of secondary pads 24' in the upper right hand quadrant of the desired circuit position defined by the master pattern circuit location. The pads of a second NAND gate in the lower right hand quadrant of the desired circuit position conforming to the good circuit are relocated in the lower right hand quadrant of the master pattern circuit location. The pads of a third NAND gate located in the upper right hand quadrant of the good circuit are relocated to the lower left hand quadrant of the desired position defined by the master pattern circuit location. And the pads of a fourth NAND gate in the upper left hand quadrant of the good circuit are relocated to the upper left hand quadrant of the desired position defined by the master pattern circuit location. The routing of the lines between pads can be selected either by computer program or manually.

Figure 5B:
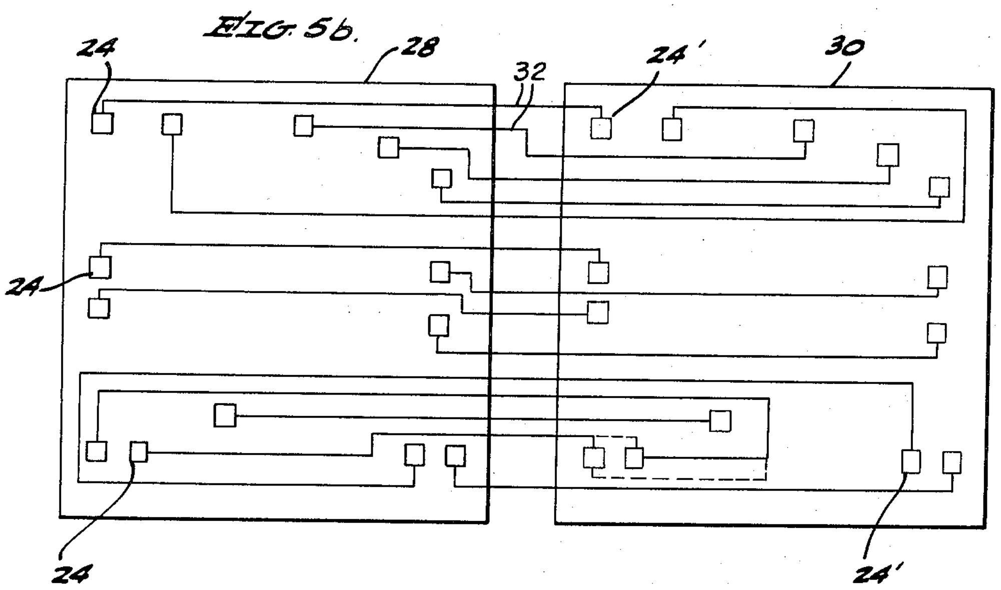

The pads 24 of a good circuit can also be relocated to sites of secondary pads 24'in a desired position defined by a master pattern circuit location in the same corresponding position relative to one another, as is illustrated in FIG. 5b. For example, all of the pads are relocated by lines 32 except for two pads in the circuit which are input connections to the same logic gate. Since these input connections can be interchanged, it is not necessary to relocate them exactly. Of course, if desired, even these pads can be relocated to their exact corresponding secondary sites as indicated by the dashed lines.

Figure 5C:
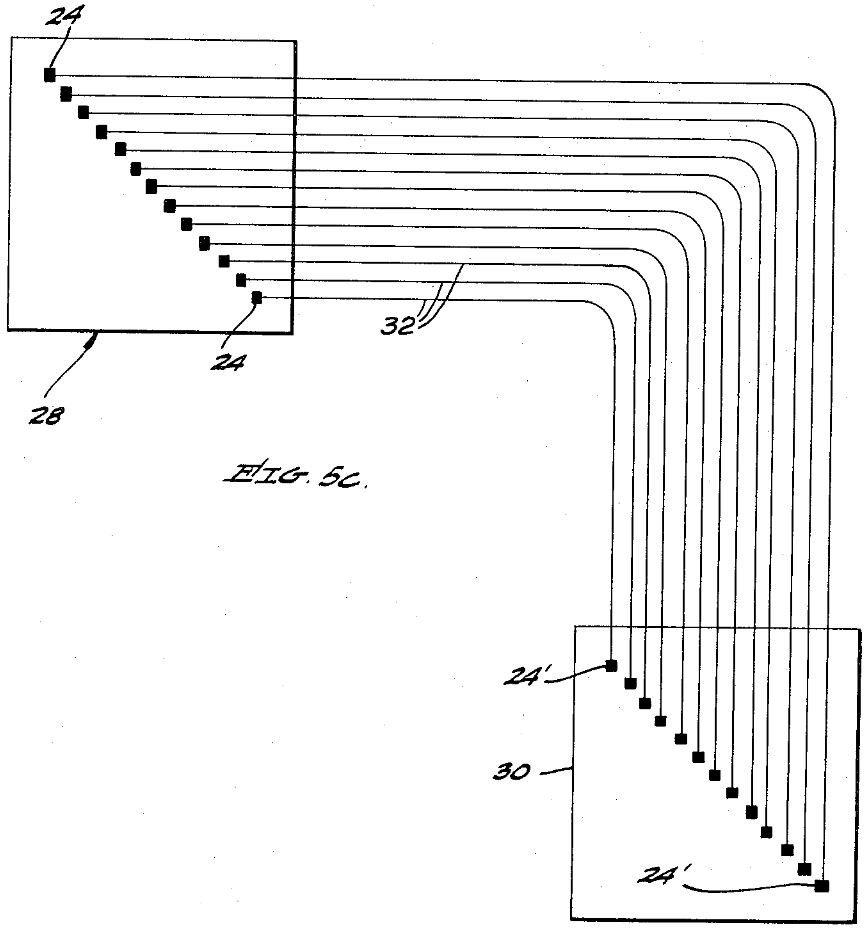

In another embodiment, illustrated in FIG. 5c, each pad location is specified during fabrication of the wafers to be located at the intersection of a unique row and column such as on or about a straight line or a diagonal axis extending between the corners of the circuits. As a result, any routing of the lines during pad relocation is greatly simplified, since the lines need merely follow a relatively simple path with a minimum number of turns between pads 24 of the good circuit and sites of secondary pads 24' forming the desired position defined by the master pattern circuit location, because the pads are not hidden behind other pads and the paths to the pads are not blocked by other lines. In addition, some of the interconnect lines indicate curved line segments and straight line segments.

Although the circuit array has been described, in which the boundary of passive or electrically insulating material surrounding each circuit can be relatively narrow, under certain circumstances, such as if yields were higher, it would be desirable to have wider boundaries, thereby forming a wider channel of electrically insulating material. Thus, since it would not be practical to route lines across a good circuit, they could be routed along the relatively wide channels. As a result, the pad relocation techniques would be applicable and the pads of a circuit could be relocated to sites of secondary pads in a desired circuit position where a functionally similar circuit, or otherwise usable circuit does not occur. For example, this technique would be applicable where all the circuits in the array are functionally similar and a good circuit does not occur at the desired position conforming to an expected master pattern circuit location. In addition, this technique would be applicable where functionally different circuits are intermixed in the array.

It is not necessary to relocate all of the pads 24 of a single good circuit 28 to sites of secondary pads 24' of a desired circuit position 30 defined by a single master pattern circuit location as illustrated in FIG. 5*a*–5*c*. For example, it may be possible to route one-quarter of the pads of a good circuit 28 to sites of secondary pads of a desired circuit position defined by one master pattern circuit location; another quarter of the pads 24 of the good circuit location 28 to sites of secondary pads of a desired circuit position defined by a second master pattern circuit location; a third quarter of the good circuit pads 24 to sites of secondary pads of a desired circuit position defined by a third master pattern circuit location, and the fourth quarter of the pads 24 of the good circuit 28 to sites of secondary pads of a desired circuit position defined by a fourth master pattern circuit location, especially when all of the pads and associated quarters of circuitry of the good circuits are operationally identical such as NAND gates. In addition, it is possible to relocate pads to other sites for standarizing the location of relocated pads.

Figure 6A:
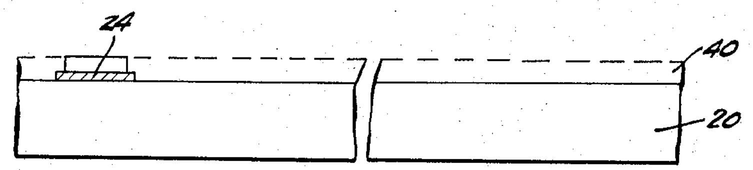
FIGS. 6*a*–6*c* are enlarged elevational cross-sectional views of a portion of the usable circuit of FIG. 5, having a layer of electrically insulating material with feedthroughs being formed by a layer of photoresist to expose the pads of the usable circuit.
Figure 6B:
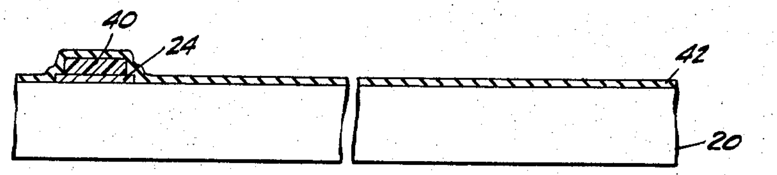
Figure 6C:
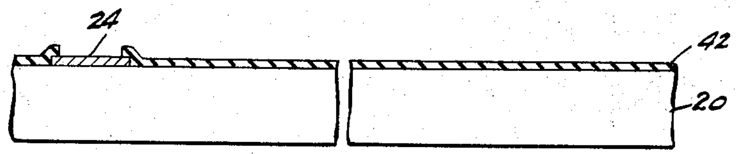

Referring now to the details of one illustrative process for relocating the good circuits in which the routing or topology of the standard layers is independent of the wafer, reference is made to FIGS. 6*a* through 6*c*, wherein a first layer of feedthroughs to the pads 24 of selected good circuits is formed. To form the feedthroughs to the pad locations of the good circuits, a layer of photoresist 40, approximately one mil thick, is laid down on top of the wafer. Thereafter, the photoresist 40 above the pad 24 is exposed to ultraviolet light in a light beam to harden the photoresist only where contact is to be made to the pad.

The light beam is formed by a light pen which includes an ultraviolet light which is focused onto the surface of the top layer on the wafer. In order to focus the ultraviolet light, an aperture or stop can be positioned between the light and a set of optical lenses to restrict the light into a beam. The lenses then focus the beam onto a layer of photo-resist on top of the wafer as a spot of ultraviolet light 1.5 mils in diameter. Optics, which will perform this function, include microscope optics in which the beam of ultraviolet light is directed through the optics in a direction opposite to the normal viewing direction. Thereafter, the photoresist 40 is developed in a photoresist developer to dissolve the unexposed photoresist 40, or nonhardened photoresist, illustrated by the phantom lines in FIG. 6*a*. As a result, only the exposed photoresist 40, remains above the pads 24. Thereafter, a layer of electrically insulating or dielectric material 42, such as low sodium glass or quartz, is *r–f* sputtered upon the surface of the wafer 20 in a layer 0.5 to one micron thick, as illustrated in FIG. 6*b*.

In order to expose the pads 24 of the good circuit, the temperature of the device is elevated, whereupon the greater thermal expansion of the photoresist 40 cracks the dielectric 42 above it and exposes the photoresist 40. Thereafter, the exposed photoresist 40 can be removed from the pad 24 by washing it away with a photoresist stripper solution which dissolves or loosens the photoresist. It may then be necessary to clean the pad 24 with chemicals, such as boiling trichlorethylene, and to even slightly etch the surface.

Figure 7A:
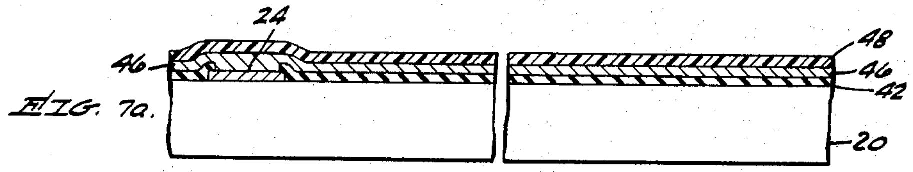
FIGS. 7*a* and 7*b* are elevational cross-sectional views of the circuit of FIG. 6 having a layer of electrically conductive material deposited thereon and formed into the interconnect lines for each exposed pad of the usable circuit and routed to its relocated pad at its desired position defined by a master pattern circuit location.

After the pads 24 of the good circuit have been exposed, the plurality of interconnect lines 32, as illustrated in FIG. 5*a*, are formed extending from the pads of the good circuit at its actual position 28 to sites of secondary pads at the desired circuit positions defined by the master pattern circuit locations. To form the interconnect line 32, a layer of electrically conductive material 46, such as, for example, aluminum or gold one micron thick, is *r–f* sputtered, *d–c* sputtered, or even vapor-deposited on the entire surface of the layer of dielectric material 42, and on exposed pads 24, as illustrated in FIG. 7*a*.

Thereafter, a thin layer of photoresist 48, less than 1/10 of a mil thick, is laid on the entire surface of the layer of electrically conductive material 46 which shall hereinafter also be referred to as aluminum. The layer of photoresist 48 is exposed to the beam of ultraviolet light produced by the light pen to form the plurality of interconnect lines 32, exemplified by FIG. 5, for each of the circuit relocations schematically illustrated in FIG. 4. In addition, where the actual position of a good circuit and the desired position of the good circuit defined by a master pattern circuit location coincide, the photoresist over the pad is exposed. This can be done by placing the wafer 20 on an *x–y* table, which is computer driven, in accordance with a predetermined program, to form the one-and-a-half mil wide line segment interconnect lines 32. Of course, thinner lines would be desirable for routing higher yield, smaller geometry circuits. It should be noted that the pad areas can be made larger than the interconnect lines' width, such as for example, three mils square, versus 1.5 mils wide, to aid alignment and connection during the interconnect processes. After the layer of photoresist 48 has been exposed in accordance with the above described pattern, it is then subjected to a photoresist 48' developer which dissolves the undeveloped photoresist indicated by the phantom line in FIG. 7*b*, leaving only the exposed or hardened photoresist 48 over the layer of aluminum 46 in the pattern of the interconnect lines and the pads, which can be considered to be interconnect areas, and exposing the aluminum layer at all other areas.

Figure 7B:
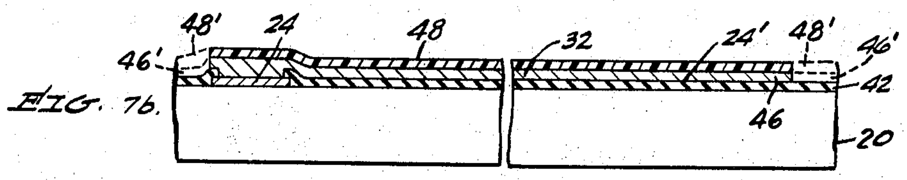

The wafer 20 is then subjected to an etching solution such as sodium hydroxide which removes all of the exposed portions 46' of the aluminum 46, leaving only the aluminum interconnect lines 32 and the pads under the hardened photoresist 48. Thereafter, the hardened photoresist 48 is subjected to a photoresist stripper solution which dissolves, or loosens, the photoresist, thereby leaving the interconnect lines of aluminum 32, as illustrated in FIG. 7*b*, but with layer 48 removed.

Alternative ways could be used for forming the feedthroughs of the pads 24 of the good circuits 28 and for forming interconnect lines 32. One of these ways would be by means of masks produced for each wafer.

For example, the feedthroughs to the pads of the good circuits could be formed by exposing the layer of photoresist 40 in FIG. 6*a* to ultraviolet light through a positive transparency whereupon only areas of photoresist above the pads 24 would be exposed. This feedthrough transparency, or mask, could be generated on the $x$–$y$ table by subjecting a high-resolution photographic film to the light beam in accordance with the selected pattern. The photographic film would then be subjected to conventional photographic processes to obtain a positive transparency through which the layer of photoresist 40 is exposed. Thereafter, the unexposed photoresist 40 could be dissolved with a photoresist developer, the layer of dielectric 42 *r–f* sputtered thereon, the device heated to crack the dielectric 42 above the photoresist 40, and the exposed photoresist removed from the pad 24 with a photoresist stripper solution.

The layer of pad relocation interconnects 32 could also be formed with a negative transparency mask made on the $x$–$y$ table by subjecting the photographic film to a light beam in accordance with the predetermined pattern or routing, whereupon an exposure pattern of pad relocation interconnect lines 32 for all of the relocated circuits would be made thereon. The film would then be subjected to standard photographic processes to obtain a negative transparency. This negative transparency would then be laid over the layer of photoresist 48 in FIG. 7*a* to expose the photoresist in the pattern of interconnect lines 32 extending between the exposed pads of good circuits 28 and sites of secondary pads at the desired circuit positions 30 defined by the master pattern circuit locations. Thereafter, the unexposed photoresist 48 is removed with a photoresist developer, the exposed aluminum etched and removed, and the remaining hardened photoresist removed with a photoresist stripper, to form the pattern of interconnect lines 32 from the pads 24 of good circuits 28 to sites of secondary pads 24'.

Figure 8:
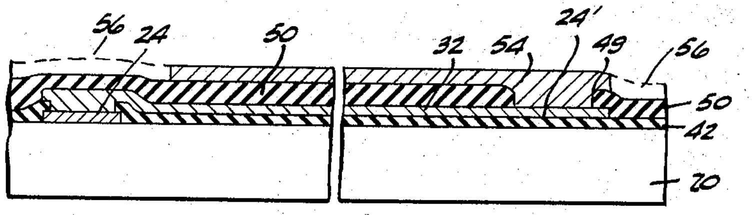
FIG. 8 is an elevational cross-sectional view of the circuit of FIG. 7, having a layer of electrically insulating material deposited thereon with a standard pattern of feedthroughs formed by a standard mask to make contact to the desired pad positions defined by the master pattern of relocated pads and a layer of electrically conductive material deposited thereon and formed into a standard pattern of interconnect lines in contact with the relocated pads at the desired positions.

The first layer of standard feedthroughs 49 to the sites of secondary pads 24', as illustrated in FIG. 8, are formed as follows. As was previously described with reference to FIG. 6*a*, a one mil thick layer of photoresist is laid down across the surface of the interconnect lines and pads 24' formed at the desired position 30 defined by the master pattern circuit location. Thereafter, the photoresist is exposed to ultraviolet light through a standard feedthrough mask so that only the photoresist above the relocated pads 24' is exposed. Then a photoresist developer is applied to the photoresist to dissolve and wash away the unexposed photoresist, leaving only the exposed or hardened photoresist above the relocated pads. A layer of dielectric 50, 1 micron thick, is *r–f* sputtered over the surface of the hardened photoresist. The temperature of the device is then elevated so that a greater expansion of the photoresist will crack the dielectric 50 above it. Once the dielectric 50 is cracked, a photoresist stripper is applied to dissolve or loosen the photoresist and thereby expose the relocated pads 24' by means of the standard feedthroughs 49.

After the relocated pads 24' are exposed, a layer of standard interconnect lines 54 is formed as further illustrated in FIG. 8. More specifically, a layer of aluminum 56, one micron thick, is sputtered, or vapor-deposited upon the surface of the glass layer 50 associated with the standard feedthroughs 49. Then, in the manner previously described with reference to FIG. 7*a*, a one-tenth of a mil thick layer of photoresist is deposited upon the surface of the aluminum 56. The photoresist is then exposed to ultraviolet light directed through a standard interconnect mask, wherein the photoresist is exposed in a pattern of standard interconnect lines which are routed from the standard feedthroughs 49 across the surface of the aluminum 56 in a predetermined pattern. Then the photoresist is washed in photoresist developer which dissolves and washes away the unexposed photoresist, thereby exposing the surface of the aluminum 56 except where standard interconnect lines 54 are to be formed. The exposed surface of the aluminum is then subjected to an etching bath, to remove the exposed aluminum represented by the dashed line. Thereafter, a photoresist stripper is applied to dissolve or loosen the photoresist, whereupon a standard pattern of interconnect lines 54 is formed.

Figure 9:
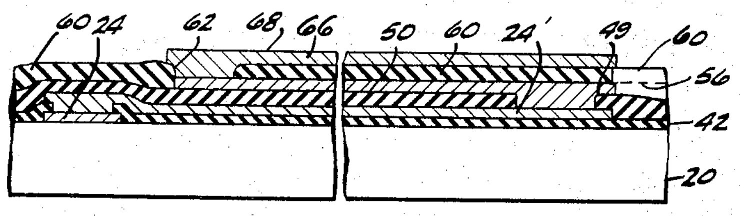
FIG. 9 is an elevational cross-sectional view of the circuit of FIG. 8, having a layer of electrically insulating material deposited thereon with a standard pattern of feedthroughs formed by a standard mask to expose selected portions of the standard pattern of interconnect lines of the preceding layers, and further having a layer of electrically conductive material deposited thereon and formed by a standard mask into standard patterns of interconnect lines in contact with the exposed portions of the lower standard pattern of interconnects through the feedthroughs.
Figure 10:
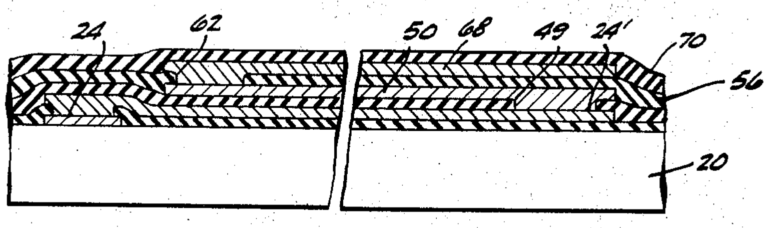
FIG. 10 is an elevational cross-sectional view of the circuit of FIG. 9, having an optional layer of electrically insulating material deposited thereon.

Another layer of dielectric material 60, having a standard pattern of feedthroughs 62 formed thereon, is laid on top of the layer of standard interconnects 54, as illustrated in FIG. 9. More specifically, a 1.0 mil thick layer of photoresist is laid down on top of the layer of standard interconnects 54 in the manner previously described with reference to FIG. 6*a*. The photoresist is then exposed to ultraviolet light through another standard feedthrough mask so that only the photoresist above selected portions of the interconnect lines 54 is exposed. Thereafter, the previously described steps of dissolving the nonexposed photoresist with the photoresist developer, laying a layer of dielectric material on it, heating the device to crack the dielectric above the exposed photoresist, and then stripping the photoresist with a photoresist stripper, are performed so that only certain portions or sections of the interconnect lines are exposed through the resulting feedthroughs 62.

Thereafter, another layer 66 of aluminum, having a standard pattern of interconnect lines 68 is laid down on top of the standard feedthrough incorporating layer 60, as further illustrated in FIG. 9. The standard interconnects 68 are formed by placing a thin layer of aluminum 66, one micron thick, over the surface of the dielectric material 60 and the standard feedthroughs 62 by sputtering or vapor deposition. Thereafter, standard interconnect lines 68 are formed in the manner previously described with reference to FIG. 7*a*, wherein a thin layer of photoresist is placed on top of the layer of aluminum and exposed through a standard mask. The nonexposed photoresist is dissolved with a photoresist developer and the exposed aluminum is etched away in an etch solution. Thereafter, the exposed photoresist is stripped away with a photoresist stripper, thereby leaving the standard interconnect lines 68 of aluminum.

Then an optional layer of dielectric material 70 can be placed upon the top standard layer of interconnects.

It should also be understood that, if it is desired or necessary, additional layers of standard feedthroughs and standard interconnect lines could be used.

Although the standard layers of dielectric and metalization have been described as being formed with standard masks, it is also possible to form their topology by means of the light pen and $x$–$y$ table.

The total number of layers of standard interconnects can be reduced if crossovers are formed at reserved circuit locations in the same layer as the pad relocation lines 32. For example, as illustrated in dashed line in FIG. 5*a*, a plurality of conductor line segments 101 are formed in a reserved circuit position not co-existent with desired positions defined by master pattern circuit locations during the metalization of the pad relocation interconnect lines 32. These line segments could be formed with the previously described light beam and $x$–$y$ table or with a mask which exposes the photoresist in a pattern exhibited by the dashed lines. Once the line segments 101 are formed, they can thereafter be used as crossovers wherein feedthroughs from standard interconnect lines in the next layer of metalization would provide a circuit path which would permit lines to cross over each other by separating them with the previously described layer of dielectric material.

At this time, it could be preferred to electrically test the interconnected wafer 20 to see if it performs the desired circuit function prior to final packaging. Alternatively, it may be desirable to package the interconnected wafer 20 and to then electrically test it, to see if it performs the desired circuit functions.

Although the relocation of circuits has been illustrated in detail on a circuit-by-circuit basis, it is fully possible to use the above described circuit relocation on 100 percent yield clusters of interconnected circuits. More specifically, a search of the wafer is made to locate clusters of 100 percent yield circuits such as, for example, a 4×5 matrix of good circuits. If one or more clusters does not have 100 percent yield, it is possible to relocate circuits to the cluster by the above described pad relocation to thereby effectively raise the yield to 100 percent. Thereafter, standard layers of interconnect could be applied to interconnect the individual circuits in each cluster so that the entire cluster will function in a predetermined manner. Thereafter, the cluster of interconnected circuits can be relocated by routing interconnect lines from the input, output, power, and ground connection pads of the cluster to sites of secondary pads of desired positions defined by a master pattern circuit on cluster locations. Then the standard pattern of interconnects could be applied to interconnect the clusters with one another.

It should be understood that the teachings herein described cover all types of integrated circuits and is not limited to MOS chips or bipolar chips. Furthermore, principles of the invention can be used in a subsystem concept wherein there might be four or more complete subsystems on each wafer, whereupon there is a probability that one of them may be bad; or there might be four different types of subsystems. It then may be necessary or desirable to use only two of these circuits or subsystems at two specified circuit locations. Consequently, the pads of the desired circuits would be relocated in accordance with the invention. Furthermore, the pad relocation technique has application where the size of the individual circuits varies either as a result of the design or as a result of process changes, masking and etching tolerances, whereupon the same standard masks could be used for junction FET, MOS FET, bipolar circuits. In addition, although the pad relocation has been described relative to an entire wafer, it is possible to use the technique on less than an entire wafer, including a portion of a wafer which is removed or cut from the wafer. Also, when the density of good circuits is quite high, it is possible to effectively disperse the circuits so that they are more uniformly distributed whereupon interconnections with the required circuits are more readily made and power dissipation is more uniform.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. An integrated circuit interconnection method for interconnecting operable circuits into an electrical function on an integrated circuit wafer having a plurality of operable and inoperable circuits, the operable and inoperable circuits having random positions in a non-uniform distribution and having primary signal-connect means associated therewith at a level of wafer metallization, comprising the steps of:

preparing a master pattern having predetermined circuit locations defining the desired positions of operable circuits to be subjected to standardized masking processes utilizing standardized opening means and standardized masking means, the predetermined circuit locations corresponding to identical desired locations of good circuits of all wafers to be similarly processed into the electrical function;

testing the plurality of operable and inoperable circuits at the primary signal-connect means to determine actual positions of operable and inoperable circuits;

comparing the actual positions of the tested operable circuits to the desired positions as determined by the master pattern and selecting operable circuits from any of the tested operable circuits irrespective of their position and distribution on the wafer, the number of the selected operable circuits being at least equal to the number of predetermined circuit locations on the master pattern;

electrically routing each of the primary signal-connect means of each of the selected operable circuits to sites of secondary signal-connect means of each of the selected operable circuits, said sites being located within the desired positions corresponding to the predetermined circuit locations of the master pattern, whereby each of the selected operable circuits are terminated in the secondary signal-connect means and in the desired positions corresponding to the predetermined circuit locations of the master pattern; and further electrically coupling the wafer circuits from the secondary signal-connect means into the electrical function by use of the standardized masking means, with the standardized opening means therein conforming in position to the positions of said secondary signal-connect means and any further signal-connect means, in a manner identical to all of the wafers to be similarly processed by the standardized masking processes into the electrical function.

2. The method of claim 1 wherein said first coupling and routing step further comprises the steps of:

electrically isolating each of the inoperable circuits, including each of the inoperable circuits coinciding with any ones of the predetermined circuit locations, and electrically isolating each of the unselected operable circuits by deposition of insulation material over the first level of metallization;

exposing the primary signal-connect means of only the selected operable circuits by masking and insulation material removal means; and routing electrical conduction means from the exposed primary signal-connect means to the sites of the secondary signal-connect means, whereby some of the secondary signal-connect means at the predetermined circuit locations are situated over or near a corresponding number of the inoperable circuits in electrical isolation therefrom.

3. The method of claim 1 in which said first coupling and routing step includes the step of routing electrical conductors in line segments from the primary signal-connect means of the selected operable circuits to the sites of the secondary signal-connect means.

4. The method of claim 3 in which said routing step includes the steps of forming a layer of photoresist material on all of the circuits and orthogonally moving the wafer relative to a beam of ultraviolet light in at least first axial and second axial directions.

5. The method of claim 1 in which said first coupling and routing step includes the step of routing electrical conductors in line segments including curved line segments from the primary signal-connect means of the selected operable circuits to the sites of the secondary signal-connect means.

6. The method of claim 1 for use with a plurality of the wafers, further including the steps of electrically coupling the primary signal-connect means of any ones of the selected operable circuits of each of the wafers to the sites of the secondary signal-connect means and electrically coupling in an indentical manner for each of the wafers the secondary signal-connect means thereof by use of the standardized masking processes utilizing the standardized masking means, with the standardized opening means therein conforming in position to the positions of said secondary signal-connect means and any further signal-connect means into identical circuit configurations corresponding to the electrical function.

7. The method of claim 1 wherein said first coupling and routing step comprises the steps of:

forming a first layer of photoresist material over the operable and inoperable circuits and the wafer;

exposing portions of the first photoresist layer overlaying the primary signal-connect means of the selected operable circuits through masking means to light to form exposed portions and unexposed portions of the first photoresist layer;

removing the unexposed portions of the first photoresist layer;

forming a layer of electrically insulating material over the circuits and the exposed photoresist portions of the first layer;

heating the device to crack the insulating material over the first layer exposed photoresist portions;

removing the first layer exposed photoresist portions and the cracked insulating material to expose the primary signal-connect means of the selected circuits through feed-through means in the insulating material;

forming a layer of electrically conductive material on the insulating material and the exposed primary signal-connect means;

forming a second layer of photoresist material on the layer of electrically conductive material;

exposing portions of the second photoresist layer in a pattern of interconnect lines extending from the exposed primary signal-connect means of the selected circuits to the sites of the secondary signal-connect means to form exposed and unexposed portions of the second photoresist layer;

removing the second layer unexposed photoresist portions to expose portions of the conductive material;

removing the exposed portions of the conductive material; and removing the exposed photoresist portions, leaving the conductive material in the pattern of interconnect lines, extending from the primary signal-connect means of the selected operable circuits to the sites of the secondary signal-connect means.

8. The method of claim 7 in which said step of exposing the second layer of photoresist material in the pattern of interconnect lines further includes the step of focusing a beam of light on the second layer of photoresist; and moving the integrated circuit wafer relative to the beam of light in a first axial direction and in a second axial direction at right angles to the first axial direction to expose the second layer of photoresist in the pattern of interconnect lines.

9. An integrated circuit interconnection method for interconnecting operable circuits into an electrical function on each of a plurality of integrated circuit wafers, each capable of performing the same electrical function, each of the wafers having a plurality of operable and inoperable circuits in random positions of a non-uniform distribution, each of the operable and inoperable circuits having primary signal-connect means associated therewith in a level of metallization, comprising the steps of:

preparing a master pattern having predetermined circuit locations, for each and every one of the wafers, the master pattern defining desired identical positions of operable circuits to be subjected to identical processing utilizing identical masking means at a level subsequent to the level of metallization;

testing the plurality of operative and inoperative circuits of each of the wafers at the primary signal-connect means to determine actual positions of operable and inoperable circuits;

for each of the wafers, comparing the actual positions of the tested operable circuits to the desired positions as determined by the master pattern and selecting operable circuits from any of the tested operable circuits irrespective of the position and distribution thereof on individual ones of the wafers, the number of selected operable circuits at least capable of performing the electrical function, and the number of the selected operable circuits being at least equal to the number of predetermined circuit locations of the master pattern;

for each of the wafers, electrically insulating the operable and inoperable circuits and the primary signal-connect means from one another to form a first insulation layer over the circuits and over the primary signal-connect means, with feedthrough means in the insulation layer opening at least to the primary signal-connect means of the selected operable circuits;

for each of the wafers, electrically routing each of the primary signal-connect means of each of the selected operable circuits through the feedthrough means and to sites of secondary signal-connect means of each of the selected operable circuits said sites being located within the desired positions corresponding to the predetermined circuit locations of the master pattern, whereby each of the selected operable circuits are terminated in the secondary signal-connect means and in the desired identical positions corresponding to the predetermined circuit locations of the master pattern; and further identical processing of each of the plurality of wafers from the secondary signal-connect means of each of the wafers by use of the identical processing utilizing the identical masking means identical to all of the wafers for interconnecting the selected operable circuits thereof in such a manner as to enable each of the wafers to perform the electrical function.

10. A method as in claim 9 wherein said step of preparing the master pattern of the predetermined circuit locations comprises the step of placing the locations in accordance with the expected density of the selected operable circuits.

* * * * *